UNITED STATES PATENT OFFICE.

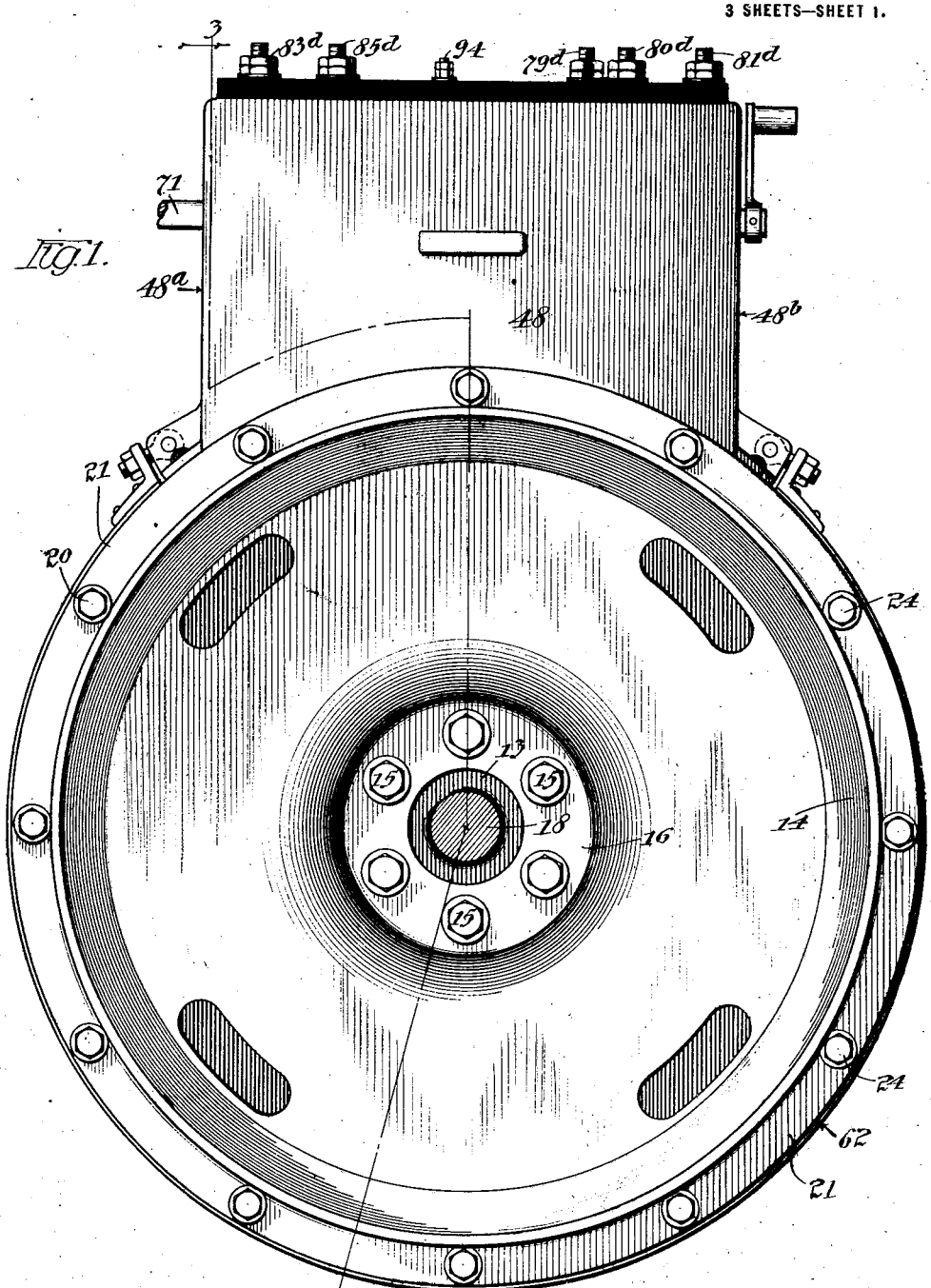

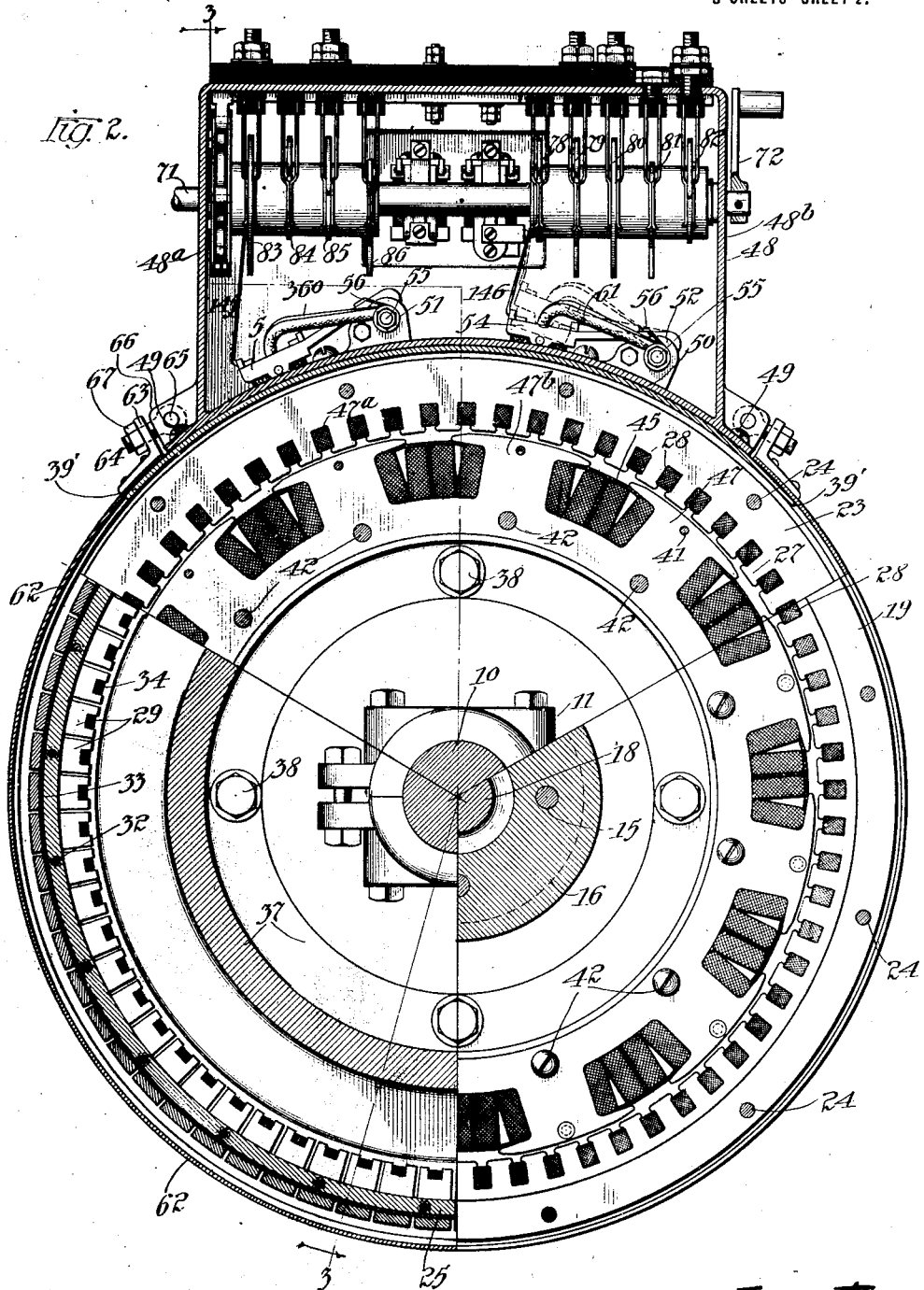

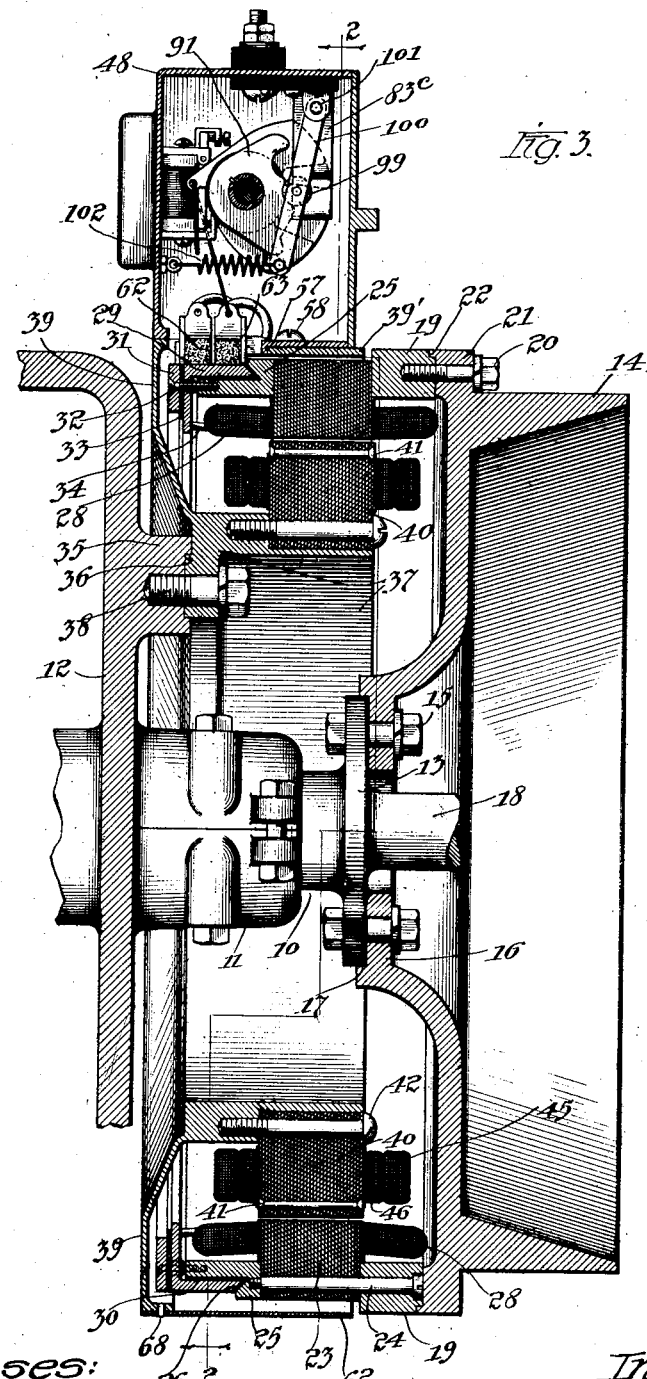

VINCENT G. APPLE, OF DAYTON, OHIO, ASSIGNOR TO THE APPLE ELECTRIC COMPANY, OF DAYTON, OHIO, A CORPORATION OF OHIO.

POWER GENERATING AND TRANSMITTING SYSTEM.

1,153,667.  Specification of Letters Patent.  Patented Sept. 14, 1915.

Application filed June 2, 1913. Serial No. 771,150.

*To all whom it may concern:*

Be it known that I, VINCENT G. APPLE, a citizen of the United States, residing at Dayton, in the county of Montgomery and State of Ohio, have invented certain new and useful Improvements in Power Generating and Transmitting Systems, of which the following is a specification.

My invention relates to improvements in power generating and transmitting systems.

One of the objects of my invention is to provide a system comprising certain interdependent associate elements consisting of a prime motor, preferably an internal combustion engine; a dynamo electric machine capable of operating as a motor, or as a generator; to start the engine, when energized by an electric storage battery, and to charge the battery when driven by the engine, and a particular form of switch for changing the circuit relations between said battery and motor, in accordance with the condition of the engine.

Another, and more specific object of my invention is to provide a dynamo-electric machine of such form and design that is especially adapted for direct connection to the power shaft of an internal combustion, the armature whereof may be substituted for the fly wheel of the engine; the dynamo-electric machine being capable of use with equal advantage to start the engine, when operating as a motor in connection with suitable batteries or to charge the batteries when being driven by the engine.

Another more specific object of my invention is the provision of a suitable switch located in the outer casing of the dynamo-electric machine, and especially adapted for the specific form of dynamo disclosed herein, and particularly well arranged to control the electric circuits connecting the battery and dynamo and sparking circuits for the engine.

Other objects of my invention will become readily apparent to persons skilled in the art from a consideration of the following description when taken in conjunction with the drawings wherein, Figure 1 is an end elevation of the dynamo-electric machine as it appears connected to the engine shaft. Fig. 2 is a section taken on line 2—2 of Fig. 3. Fig. 3 is a transverse section taken on line 3—3 of Figs. 1 and 2.

In all the views the same reference characters are employed to indicate similar parts.

My system is especially adapted for use in connection with a prime motor which is not self starting, such as an internal combustion engine, as it is used in automobiles, power boats and the like.

In the exemplification chosen to illustrate my invention 10 is the power shaft of an internal combustion engine finding bearing in the hub 11 which projects from the frame, or a portion of the casing 12. Near its outer end it is provided with a laterally projecting flange 13 to which is connected an angular friction clutch member 14, as by bolts 15. The inner or ring portion 16 of the clutch member 14 is counter-bored as at 17 to fit snugly over the disk 13, thereby to locate the clutch member 14 concentric with the shaft 10 and to more firmly hold it in connection therewith.

A reduced end 18, of the shaft 10, projects through the clutch member 14 to afford a bearing for the conical, friction, companion clutch member, that is not shown in Fig. 3.

So far as described the structure is common with engines that are employed for the propulsion of automobiles, or like vehicles, with the exception that in many instances the member 14 is made much heavier, than shown, so as to serve as a fly wheel. In my structure I prefer to make the member 14 somewhat lighter than usual and to connect thereto the armature of the dynamo electric machine.

In the construction of the armature I provide a metal annulus 19 and connect it to the clutch member 14, as by bolts 20, that pass through a radially extending flange 21 at intervals around the clutch member 14, as shown more clearly in Fig. 1. The flange 21 is counter-bored, as at 22, for the purpose of centering the annulus 19 therein and to hold it concentric with the shaft and member 14 and more firmly in position.

A series of thin iron rings 23 form the core of the armature and are held in place by means of screws 24 that pass through the annulus 19 into a similar annulus 25 on the other side of the core and in this manner the armature of the dynamo-electric machine is supported by a rotating part of the engine. The annulus 25 is undercut on its peripheral, outside surface, as at 26, to provide means for securing the segments of the commutator in place. The armature 23 is provided with inwardly projecting teeth 27 between which electric conducting coils 28 are wound.

A series of commutator segments 29 are insulatedly supported on the annulus 25 as shown at 30, and are tapered at their inner edges to conform with the undercut 26, suitable insulation being included between the said commutator segments and the annulus 25 as shown. A ring 21, substantially equal to the diameter of the commutator overlies the side edges of the segments 29 and is held in place by screws 32 suitably spaced apart and taking into the edge of the annulus 25. The commutator segments are insulated from the screws, and from the ring 31, as clearly shown in Fig. 2, and each segment is connected to its respective armature coil 28 by a conductor 34.

It will now be seen that the rotating armature is directly connected to the shaft 10 through the instrumentality of the clutch member 14 and that the armature of the dynamo-electric machine, is a part of the inertia member, or fly wheel, and is directly rotatable by the engine. It is further to be observed that the rotatable clutch member 14, occupies the vertical plane which is usually occupied by the fly wheel of the gas engine, and that my dynamo electric machine does not require an increased length of the shaft 10 in order to accommodate it, said dynamo-electric machine being located between the inner surface of the member 14 and the frame 12 of the engine, thereby utilizing this space, which is usually lost and unoccupied, without the necessity of increasing the length of the engine shaft.

The engine frame 12 carries an annular projecting rim 25, counter-bored, as at 36, to receive a ring 37 which affords support for the magnetic field member of the dynamo-electric machine. The ring 37 is attached to the frame 12 by screws 38 that are located at circumferential intervals, as shown in Fig. 2. A shield 39 and 39' is preferably an integral part of the ring 37. The shield extends radially between the armature and the frame 12 to protect the armature from dirt, grease and the like and peripherally around the top of the casing to provide means whereby to secure the switch casing. The field member 40 is made of a series of thin iron disks held together by rivets 41 placed at intervals around the annular core and located near the outer edge of each of radially projecting poles of the core, being secured to the ring 37 by bolts or screws 42.

In the specific machine required for my system, the armature slots are wound with a series winding 45 and a shunt winding 46 around the projecting poles 47.

The dynamo electric machine depicted in the drawings has 12 magnetic poles and the armature is so connected that two sets of collecting brushes are sufficient to collect the current from the rotating armature.

The collecting brushes are located in radial planes taken through the center of the poles 47ª and 47ᵇ respectively. The brushes are shown located near the upper portion of the machine within a switch casing or housing 48, and each set of brushes comprise a pair that are radially presented to the surface of the commutator, each pair comprising a high resistance brush and a low resistance brush, composed preferably of carbon and copper gauze, or ribbon, respectively. The high resistance, or carbon brush, is to be used alone at the time when the dynamo-electric machine is operating as a generator. When the dynamo-electric machine is to be used as a motor, for the purpose of starting the engine, there will be a large flow of current from the storage batteries to the armature of the machine and for this reason I prefer to use collecting brushes having relatively low resistance and large carrying capacity. I therefore provide brushes made of copper gauze, or the like, in association with the brush, or brushes, of carbon or graphite, or like material, which latter are better adapted for use when the dynamo-electric machine is generating a relatively small current, as when it is operating as a generator and being driven by the engine. After the engine has been properly started by the dynamo-electric machine, functioning as a motor, I prefer to raise the low resistance brushes from the commutator and operate the generator with the carbon brushes only. I do this for the reason that it is not so practical to run the dynamo in such an environment with heavy copper collecting brushes as it is when carbon or graphite brushes of relatively high resistance are employed, at the time when the dynamo is generating a relatively small current.

As the switch, for changing the relations between the storage battery of the dynamo is to be operated at the time when the transition is made, I prefer to raise the low resistance copper brush from the commutator by the instrumentality of a part of said switch.

The part 39' is segment or ring-shaped, extends forwardly and is preferably an integral part of the disk-part 39, and upon this part 39' the switch housing 48 is mounted, being held in place thereon by screws 49. The bottom 50, of the housing 48, is substantially parallel with the segment 39' and from this bottom portion rise brackets 51, 52 for pivoted support of the collecting brush holders 53 and 54, respectively. These holders are pivoted in the brackets 51 and 52, as at 55, and are yieldingly held in downward positions by means of the springs 56, respectively. The brush-supporting brackets may be made separable from the floor 50 of the housing 48, or they may be integral, as desired. If they are separable I prefer to connect them to the associate part by means of flat portions 57 secured by the screws 58 as more clearly shown in Fig. 3.

Conducting wires 60 and 61 connect the brushes, respectively, to a relatively stationary part. I prefer to place the brushes, of like character on the commutator in staggered relation, so that there will be a low resistance, or copper brush on each side of the commutator and a high resistance, or carbon brush on each side, thereby to prevent unequal wear of the commutator surface, as when all of the brushes are in contact or when only diagonally disposed brushes are in contact with the commutator.

For easy access to the dynamo parts I provide a removable band 62, which accords a peripheral wall for the casing within which to inclose the dynamo. To each end of the band I secure brackets 63 held in place by bolts 64, that are pivoted, as at 65, in projections 66 from the switch housing 48. To remove the band 62 it is only necessary to take off the nuts 67. For providing additional means for holding the band to prevent its circumferential shifting I prefer to use pins 68, of which there may be several and which take through suitable perforations in the band 62. When the band is loosened it will fall off from engagement with the pins 68, and when it is replaced the pins serve as guides for the proper location of the band.

An oscillatable switch member extends longitudinally across the interior of the casing, or housing 48, and finds bearing in the side walls thereof 48ᵃ and 48ᵇ. The axle of the movable switch element is preferably a tube 71, provided on its outer projecting end with an operating handle 72. This handle may be of any particular or convenient form or configuration for the purpose of operating the switch. Spaced apart on the switch element are switch blades 78, 79, 80, 81, and 82 on one side and blades 83, 84, 85, and 86, on the other side. The blades 78 and 83 are each provided with a tail piece, each provided with a perforation for a flexible connection between these tail pieces and the respective collecting brushes of the commutator, whereby the said brushes may be properly raised from contact with the commutator at the time when the dynamo-electric machine is operating as a generator as when the switch is thrown to a certain position to cause the dynamo-electric machine to operate as a generator and permit it to be returned thereto when the switch is thrown to such position as to cause the dynamo-electric-machine to be operated as a motor, more specifically to be hereinafter explained.

Stationary, spring-clip switch members are located in line to one side of the axis of the moving switch member for convenient and proper engagement of the respective blades operated and carried by this member.

The roller 99 is carried by a lever 100, pivoted to the upper part of the switch casing 48, as at 101, and held, with its free end in a rearward position, by the yielding spring 102. This spring forces the roller 99 into contact with the cam 91. When the switch element is oscillated so that the roller 99 rides upon lower surface of the cam 91, as when the handle 72, of the switch, is pushed away from the operator, the circuits will be in proper shape or arrangement for starting the dynamo-electric machine as a motor and causing it to operate, as such, by the circuits preliminarily rotating the internal combustion engine, with which it is associated. It is necessary for the operator to retain the handle against the force of the spring 101, in the position in which it has been placed to accomplish this result, or until the engine becomes self propelling, in which event it will then drive the dynamo as a generator. It will then be appropriate for the switch to be so turned that the dynamo, when operating as a generator will charge the batteries with which it is associated. If the handle 72 be now released the spring 102 will cause the cam 91 to be returned to the transition position, wherein the lighting circuits only, are operative (through the instrumentality of the switch) and then, if it is desired that the dynamo, after being driven by the engine in the manner described, shall charge the storage batteries the switch must be turned, by moving the handle 72, toward the operator until the roller 99 enters the depression at the top of the cam 91. When the current is passing over the circuits, for the purpose of starting the motor, both pairs of the collecting brushes 53 and 54 are in contact with the peripheral surface of the commutator and the switch blades are in such position as to permit this relation of both pairs of brushes. Now when the engine has become self propelling, and it is desired to have it charge the batteries, the switch is turned, so that the roller 99 will be forced into the central depression of the cam 91, the tail pieces of the blades 83 and 78 are raised and the flexible connectors, 144 and 145, which connect the brushes with the respective blades, lift the respective brushes from contact with the commutator. This occurs when the blades of the switch are depressed and the rear portions thereof are elevated, so that when the dynamo electric machine is operated as a generator, the low resistance, copper, collecting brushes, are not in contact with the commutator surface.

While I have herein shown a single embodiment of my invention for the purpose of clear disclosure it is evident that considerable change may be made from the specific construction without departing from the scope of the appended claims.

Having described my invention, what I claim is—

1. The combination with a stationary field magnet frame, of a rotatable armature surrounding said field magnet frame, an imperforate disk extending radially outwardly from one end of the field magnet frame to points beyond the periphery of the armature, and a removable flexible strip carried on the periphery of said disk and extending axially across the periphery of the armature.

2. The combination with a stationary field magnet frame, of a rotatable armature surrounding said field magnet frame, an imperforate disk extending radially outwardly from one end of the field magnet frame to points beyond the periphery of the armature, an arcuate projection extending across the periphery of the armature from the periphery of said disk, commutator brushes carried by said projection and a removable casing member carried on the periphery of said disk, extending axially across the periphery of the armature and secured at its ends to said arcuate projection.

3. The combination with a stationary field magnet frame, of a rotatable armature surrounding said field magnet frame, an imperforate disk extending radially outwardly from one end of the field magnet frame to points beyond the periphery of the armature, an arcuate projection extending across the periphery of the armature from the periphery of said disk and having an opening therein, commutator brushes carried by said projection and extending through said opening, a box like cover carried by said projection and entirely inclosing said brushes, and a strip of sheet metal contacting at one edge with the periphery of said disk and secured at its end to said arcuate projection.

4. The combination with an engine shaft, of an engine casing, a bearing for said shaft carried by the casing, a field magnet frame, surrounding said shaft and carried by the casing, a rotatable armature surrounding said field magnet frame and connected with said shaft, and a commutator positioned on the periphery of said armature at the side adjacent said casing.

5. The combination with an engine casing and engine shaft of a dynamo-electric machine, comprising a stationary field magnet frame secured to the casing and concentric with the shaft, an armature rotatable about the field magnet frame, a commutator on said armature at the end adjacent the frame, a clutch member secured at its periphery to the opposite end of the armature and connected at its center with the engine shaft, a support projecting from the field magnet frame between the engine casing and armature and commutator brushes carried thereby.

6. In a dynamo electric machine, an armature comprising a core, suitable windings and a commutator; a ring on one side of the core radially beyond the windings and a second ring on the other side of the core, the second ring supporting the commutator; screws passing through the first ring and core into the second ring; a clutch member having a radially projecting flange overlying said screws to hold them in place and other screws taking through said flange into said first ring to secure said clutch and armature together.

In testimony whereof I hereunto set my hand in the presence of two witnesses.

VINCENT G. APPLE.

In the presence of—
   FORÉE BAIN,
   MARY F. ALLEN.